Patented May 29, 1945

2,377,025

UNITED STATES PATENT OFFICE 2,377,025

CONVERSION OF A MIXTURE OF ACETALDEHYDE AND ETHYLENE TO BUTADIENE

Harry Miller, Columbia, Mo., assignor, by mesne assignments, to National Agrol Company, Inc., Washington, D. C., a corporation of Delaware No Drawing. Original application March 25, 1942, Serial No. 436,150. Divided and this application November 25, 1942, Serial No. 466,943

6 Claims. (Cl. 260—681)

This invention relates to a dehydration catalyst, and more particularly to a method of using the same for the decomposition of materials such as acetaldehyde and methyl ethyl ketone and coupling of some of the products.

This application is a division of my earlier application Serial No. 436,150, filed March 25, 1942.

Among the objects of this invention may be noted the provision of a catalytic method for decomposing materials such as acetaldehyde and methyl ethyl ketone; the provision of a catalytic method for decomposing acetaldehyde and simultaneously coupling the resulting acetylene with ethylene; the provision of a catalytic method for decomposing methyl ethyl ketone to form 1,3-butadiene; and the provision of an efficient method for decomposing materials such as acetaldehyde and methyl ethyl ketone to form 1,3-butadiene. Other objects will be in part obvious and in part pointed out hereinafter.

The invention accordingly comprises the steps and sequence of steps, and features of synthesis, analysis, or metathesis, which will be exemplified in the processes hereinafter described, and the scope of the application of which will be indicated in the following claims.

According to the present invention, a catalyst is provided which will convert acetaldehyde to acetylene and will couple acetylene with ethylene to form 1,3-butadiene, and which will likewise convert methyl ethyl ketone directly to 1,3-butadiene. Ethyl alcohol is easily available in large quantities, and at a relatively low cost. 1,3-butadiene is of substantial value, since it is one of the principal raw materials for the production of many synthetic rubbers.

The catalyst of the present invention is composed of at least three components. These are first, a metal which will form a heavy metal acetylide. Typical of such dehydrogenative metals are copper, silver, and mercury. In lieu of the metal itself a readily decomposable salt of the metal may be employed, such as the nitrates. Second, a metal of the class typified by aluminum, magnesium and zinc. Third, a compound of a metal from family A of group VI of the periodic table, such as chromium, molybdenum, tungsten, and uranium. These group VI metals may be employed in the form of their acids, oxides or nitrates; for example, chromic acid, molybdic acid, tungstic acid and uranium oxide or nitrate.

The catalyst of the present invention is composed of at least one of the substances of each of the above groups. The compounds are preferably in the finely divided state, and the aluminum, magnesium or zinc is preferably in the form of granules of approximately 30 mesh size. In preparing the catalyst of the present invention, approximately the following proportions by weight should be used. A total of about 100 parts of one or more metals from the second group are taken. To this is added 5 to 10 parts in all of one or more of the substances from the first group, and a similar proportion of substances from the third group. The ingredients are then mixed together in such a way that the particles of the second group metals are thoroughly coated with the other substances. This may be accomplished by rubbing the components together vigorously, in such a way as to obtain a pestle-like action. The mixture is then heated in air to a temperature about 50° C. above the melting point of the second group metal or metals employed. The catalyst is then cooled and is ready for use.

In use, the catalyst is placed in a suitable chamber in a manner affording intimate contact between it and vapors which are passed therethrough. The acetaldehyde or methyl ethyl ketone is passed over the catalyst in vapor form. If desired, the acetaldehyde may be mixed with a relatively large proportion of ethylene, so as to directly obtain 1,3-butadiene. Where methyl ethyl ketone is treated, the product is 1,3-butadiene. The reaction is carried out at a temperature between 200° C. and 350° C. The reaction products are preferably condensed and removed along with the water, while unaffected material and unused ethylene may be recycled. The ethylene and butadiene may be separated in the customary manner by a refrigerating system, or by compression to about 100 pounds per square inch at atmospheric temperature. Other methods for separating the butadiene and ethylene may of course be employed, such as by reaction with maleic anhydride.

Utilizing as the raw material ethyl alcohol, the course of the reaction may be represented as follows:

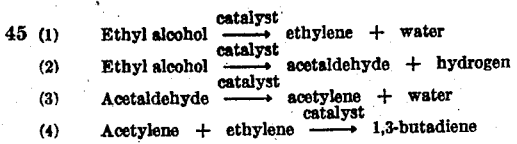

Reaction (1) may be carried out in the usual way, utilizing as a catalyst activated alumina, sulfuric acid, or the like. Reaction (2) may be effected with metallic silver or copper in the customary manner. Reactions (3) and (4) are, however, carried out with the catalyst of the present invention. As indicated above, reactions (3) and (4) may be carried out simultaneously by passing over the catalyst a mixture of acetaldehyde and ethylene, the latter preferably in substantial excess.

As an illustration of the foregoing, alcohol vapors are passed through a chamber containing a catalyst, such as activated alumina, sulfuric acid or the like, and reaction (1) is carried out. Another quantity of alcohol is passed over metallic silver, copper or the like in the usual manner, and reaction (2) is obtained. The reaction products are cooled and the water and unaffected alcohol are removed as by condensation. The acetaldehyde and hydrogen formed in the second reaction are separated, and the acetaldehyde and ethylene are then passed over the catalyst of the present invention to obtain 1,3-butadiene. Atmospheric pressure may be employed for both reaction (3) and reaction (4).

If desired, the acetaldehyde may be separately treated by passing it over the catalyst of the present invention, whereupon it will be found that acetylene and water are formed in accordance with reaction (3). The acetylene and ethylene are then mixed, and in vapor form are passed over the catalyst of the present invention. They combine in equal molecular proportions. To obviate polymerization of the acetylene, the ethylene should be preferably 100% in excess over the acetylene. The butadiene may then be condensed and removed, and the ethylene recycled.

The following is an example of a suitable catalyst for carrying out the conversion of acetaldehyde to acetylene, and the coupling of acetylene and ethylene to form 1,3-butadiene. All parts are by weight:

To metallic aluminum (90 parts) in the form of 30 mesh particles is added molybdic acid (6 parts), chromic acid (6 parts), silver nitrate (12 parts), and cupric nitrate (15 parts) containing three molecules of water of crystallization. The components are mixed together and rubbed thoroughly in a mortar and pestle, until all of the aluminum particles are thoroughly coated with the four other ingredients. The mixture is then heated in air to about the melting point of aluminum. After cooling, the catalyst is ready for use, preferably for carrying out the reaction referred to at a temperature of about 250° C.

In the foregoing example, the silver nitrate may be replaced by a chemically equivalent proportion of finely divided metallic silver or of an easily decomposable silver salt. Analogously the cupric nitrate may be replaced with the chemical equivalent of another easily decomposable copper salt, or of finely divided metallic copper.

Likewise, the proportion of silver to copper may be varied, provided the combined total of both is the chemical equivalent of approximately the above. Likewise, the proportion of molybdic acid and chromic acid may be varied, provided the combined total is chemically equivalent to approximately the above. The proportion of aluminum to the other ingredients should be such that substantially all of the other ingredients can be taken up as a coating on the metallic aluminum particles, and the aluminum particles well covered. The aluminum can be replaced with magnesium or zinc particles in appropriate proportions to meet the above requirement.

As a source of alcohol, distillery heads or "head's alcohol" may be used. This raw material is available from the commercial manufacture of ethyl alcohol and frequently constitutes an undesirable by-product. It is useful in carrying out the present invention, and is an inexpensive substitute for pure ethyl alcohol.

As indicated above, the catalyst of the present invention may be employed in decomposing methyl ethyl ketone to form 1,3-butadiene. The reaction is in this case likewise carried out with the methyl ethyl ketone in vapor form, and at a temperature of 200-350° C.

Throughout the claims, it will be understood that where the metals themselves of the first and third groups above mentioned are referred to, their readily decomposable salts, acids or other compounds are included.

In view of the above, it will be seen that the several objects of the invention are achieved and other advantageous results attained.

As many changes could be made in the above processes without departing from the scope of the invention, it is intended that all matter contained in the above description shall be interpreted as illustrative and not in a limiting sense.

I claim:

1. The method of forming 1,3-butadiene which comprises passing a vapor containing acetaldehyde and ethylene at substantially atmospheric pressure and at a temperature of between about 200° C. and 350° C. over a catalyst having a base consisting of at least one metal selected from the group consisting of aluminum, magnesium and zinc, said base being coated with a metal capable of forming a heavy metal acetylide, and an oxide of a family A of group VI metal.

2. The method of forming 1,3-butadiene which comprises passing a vapor containing acetaldehyde and ethylene at a temperature of 200-350° C. over a catalyst having a base consisting of at least one metal selected from the group consisting of aluminum, magnesium and zinc, said base being coated with a metal capable of forming a heavy metal acetylide, and an oxide of a family A of group VI metal.

3. A process in which the vapors of acetaldehyde, in the presence of ethylene, are brought in contact with a catalyst, at a temperature of between about 200° C. and 350° C., comprising a base metal, selected from the group consisting of aluminum, magnesium and zinc, a portion of which is in combination with an acidic oxide of a metal selected from family A of group VI of the periodic table in close association with a metal capable of forming a heavy metal acetylide.

4. The method of forming 1,3-butadiene which comprises passing a vapor containing acetaldehyde and ethylene, and containing a substantial excess of ethylene, at a temperature of between about 200° C. and 350° C. over a catalyst comprising a base of aluminum, said base being coated with a mixture comprising silver and copper and oxides of chromium and molybdenum.

5. The method of forming 1,3-butadiene which comprises passing a vapor containing acetaldehyde and ethylene, and containing a substantial excess of ethylene, at substantially atmospheric pressure and a temperature of between about 200° C. and 350° C. over a catalyst comprising a base of a metal selected from the group consisting of aluminum, magnesium and zinc, said base being encrusted with a mixture of a metal selected from the group consisting of metals which form a heavy metal acetylide and a partially reduced oxide of a metal selected from the group consisting of family A of group VI of the periodic table.

6. The method of forming 1,3-butadiene which comprises passing a vapor containing acetaldehyde and ethylene, and containing a substantial excess of ethylene, at substantially atmospheric pressure and a temperature of between about 200° C. and 350° C. over a catalyst comprising a base of a metal selected from the group consisting of aluminum, magnesium and zinc, said base being encrusted with a mixture of a metal selected from the group consisting of metals which form a heavy metal acetylide, an oxide of the base metal and a partially reduced oxide of a metal selected from the group consisting of family A of group VI of the periodic table.

HARRY MILLER.